United States Patent [19]

Iwakiri

[11] Patent Number: 5,311,765
[45] Date of Patent: May 17, 1994

[54] DEVICE FOR DETERMINING ENGINE KNOCKING INTENSITY FROM DETECTED VARIATIONS IN ENGINE CYLINDER INTERNAL PRESSURE

[75] Inventor: Yasunori Iwakiri, Kanagawa, Japan

[73] Assignee: Nissan Motor Co., Ltd., Kanagawa, Japan

[21] Appl. No.: 808,851

[22] Filed: Dec. 18, 1991

[30] Foreign Application Priority Data

Dec. 21, 1990 [JP] Japan .................................. 2-405077

[51] Int. Cl.[5] ............................................ G01L 23/22
[52] U.S. Cl. .......................................... 73/35; 73/116
[58] Field of Search ............................. 73/35, 116, 115

[56] References Cited

U.S. PATENT DOCUMENTS 4,821,194 4/1989 Kawamura ........................ 73/35 K

OTHER PUBLICATIONS

Yoshihisa Kawamura et al., "Recent Technologies in Knocking-Detection and It's Quantitative Processing in Spark Ignition Engine" Journal of the Society of Automotive Engineers of Japan, vol. 40, No. 11, 1986, pp. 1409-1417.

Primary Examiner—John E. Chapman
Assistant Examiner—Helen Kwok
Attorney, Agent, or Firm—Lowe, Price, LeBlanc & Becker

[57] ABSTRACT

This invention relates to an engine knocking detector for determining knocking intensity from the oscillation waveform of the cylinder internal pressure. The total amount of heat generated in the combustion chamber during one revolution of the crankshaft is computed from the pressure waveform from which high frequency components have been eliminated, and from the running state of the engine. Also, the knocking start point during one revolution of the crankshaft is determined by comparing high frequency components extracted from the waveform and a predetermined reference value, and the amount of heat due to knocking is computed. A knocking intensity is then determined by comparing these two amounts of heat. By detecting knocking based on this comparison of amounts of heat generated in the combustion chamber, the knocking can be detected with high precision by means of a common logic irrespective of engine differences, installation positions of cylinder internal pressure sensors and individual sensor differences.

3 Claims, 11 Drawing Sheets

DEVICE FOR DETERMINING ENGINE KNOCKING INTENSITY FROM DETECTED VARIATIONS IN ENGINE CYLINDER INTERNAL PRESSURE

FIELD OF THE INVENTION

This invention relates to an engine knocking detector, and more specifically, an engine knocking detector which judges knocking intensity from the waveform pattern of the cylinder internal pressure.

BACKGROUND OF THE INVENTION

Since electronic control technology has come to be used widely for controlling vehicles and vehicle engines, many methods have been proposed for dealing with knocking. In addition to improving the shape of the combustion chamber, improving gas flow and prevention of knocking by increasing the octane value of the fuel, knocking control techniques which aim to provide optimum fuel cost performance or dynamic performance for each running condition irrespective of differences in the nature of the fuel and time-dependent variations of the octane value required by the engine, are coming to be applied to mass-produced vehicles by advancing the ignition period to a limit at which knocking can hardly be heard by the human ear. Some of these techniques are now being applied to each cylinder of six cylinder engines.

The detection and quantization of knocking are important factors in onboard knocking control techniques using electronics. The knocking control devices installed in an automobile might for example use cylinder internal pressure, engine vibration, combustion light, knocking noise and ion current in the cylinder as possible knocking detection parameters.

One such detector is disclosed in Vol. 40, No. 11 of Jidosha Gijutsu ("Automobile Technology") published in Japan in 1986. This detector comprises an cylinder internal pressure sensor mounted on the spark plug for detecting the pressure in the combustion chamber, extracting high frequency components in the region of the knocking frequency from the waveform pattern of the cylinder internal pressure found from the output of this pressure sensor, converting the vibration intensity to a number, and using statistical processing to determine a knocking level.

However, in the aforesaid knocking detector, the detection results are easily influenced by the position and specification of the cylinder internal pressure sensor, or according to the cylinder in which the knocking detection is performed. To eliminate this influence the knocking detection logic had to be optimized for each type of engine which increased the number of operations and cost involved, and knocking detection precision was impaired if the logic was not properly optimized.

Further, although the cylinder internal pressure sensor mounted on the spark plug has the advantage that no special modification of the engine is required, it also picks up mechanical vibrations of the engine in addition to the combustion pressure. If high frequency signal components of the sensor output waveform are used, it is difficult to separate frequencies due to noise, and it was therefore difficult to increase the detection precision of knocking components. In particular, as high frequency vibrations increase when the engine is running at high speed, the detection of knocking components if rendered extremely difficult.

SUMMARY OF THE INVENTION

It is therefore an object of the invention to detect knocking with high precision using a common logic irrespective of the type of engine or of individual sensor differences.

It is a further object of the invention to provide a knocking detector which involves few operations at low cost.

In order to achieve the above objects, this invention provides a knocking detector for an engine provided with a crankshaft and combustion chamber. This detector comprises means for detecting regularly a combustion pressure in the combustion chamber and outputting a corresponding pressure waveform, means for eliminating high frequency components from the waveform, means for extracting high frequency components from the waveform, means for detecting a running state of the engine, means for detecting a rotation angle of the crankshaft, means for computing a total amount of heat generated in the combustion chamber during one revolution of the crankshaft based on the waveform processed by the high frequency component eliminating means, and on the running state of the engine, means for setting a reference level regarding the extracted high frequency components based on the running state of the engine, means for determining a knocking heat start point during one revolution of the crankshaft based on the extracted high frequency components and the reference level set by the setting means, means for setting a knocking heat end point during on revolution of the crankshaft, means for computing a knocking heat generated during one revolution of the crankshaft based on the knocking heat start point and end point, and on the waveform processed by the high frequency component eliminating means, means for determining a knocking intensity based on the total amount of heat and knocking heat.

Preferably, the reference level is approximately constant up to a predetermined engine speed, and varies in linear proportion to the engine speed thereafter.

Also preferably, the high frequency component extraction means extracts high frequency components from 30 kHz to 40 kHz.

DESCRIPTION OF THE PREFERRED EMBODIMENTS

Figure 1:
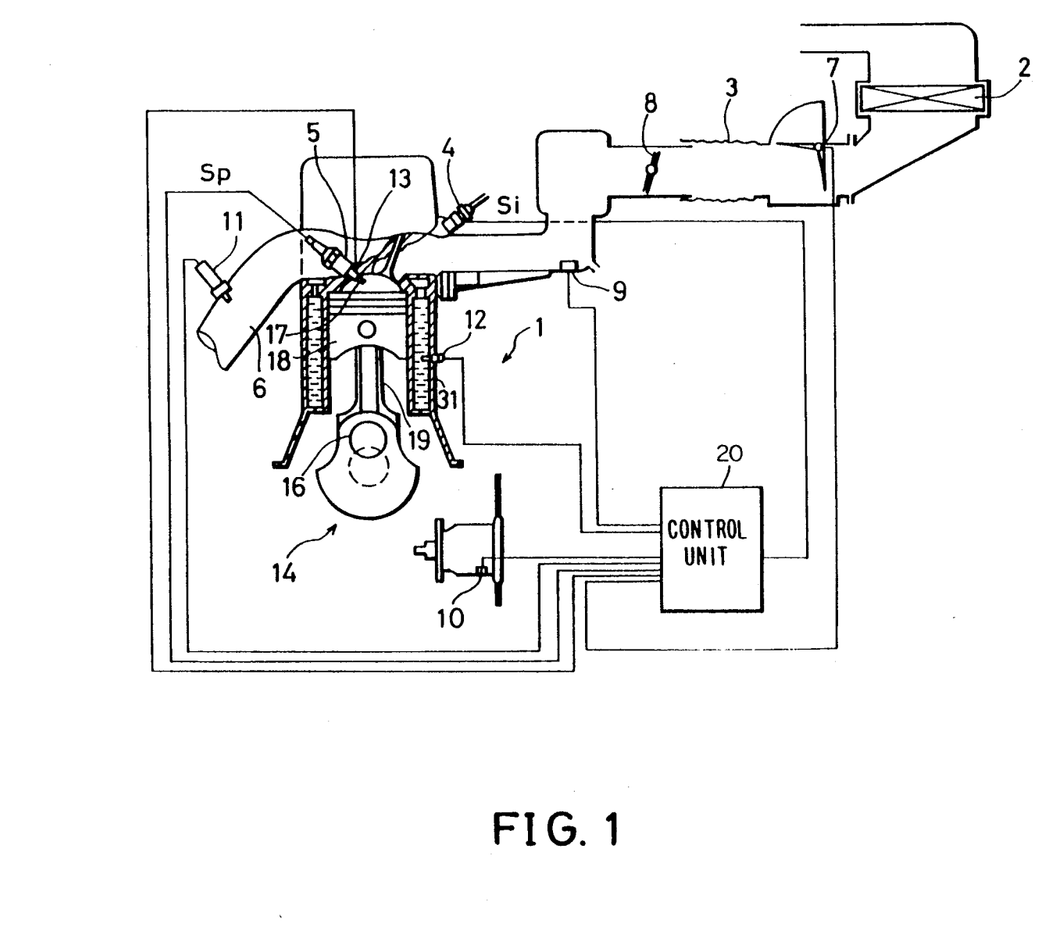
FIG. 1 is a schematic diagram of an engine comprising a knocking detector according to this invention.

FIG. 1 shows part of the structure of an engine combustion control system which uses a knocking detector according to this invention. In an engine 1, air is aspirated into a combustion chamber 17 via an air cleaner 2 and intake manifold 3, and an injector 4 injects fuel into this intake air based on an injection signal Si. The air-fuel mixture aspirated into the combustion chamber 17 is ignited by a spark plug 5 in response to an ignition signal Sp, burnt, and exhaust gas is ejected from an exhaust manifold 6.

An air volume Qa aspirated into the combustion chamber 17 is measured by an air flow meter 7, this air volume Qa being controlled by a throttle valve 8 installed in the intake manifold 3. Further, an intake pressure sensor 9 installed in the intake manifold 3 detects a negative intake pressure in the intake manifold 3.

The rotation angle of a crankshaft 16 is detected by a crank angle sensor 10. The output pulses from this sensor 10 are counted to compute a rotation speed N of the engine 1.

An $O_2$ sensor 11 is installed in the exhaust manifold 6 for detecting an oxygen concentration in the exhaust gas. A temperature sensor 12 is attached to a water jacket 31 for detecting the temperature of coolant flowing through the water jacket 31.

The combustion pressure in the combustion chamber 17 is detected by a cylinder internal pressure sensor 13. The cylinder internal pressure sensor 13 is fitted to the cylinder head of the engine 1 as a washer of the spark plug 5, and outputs a signal which varies in proportion to the pressure in the combustion chamber 17. Another possible construction of the cylinder internal pressure sensor 13 is to incorporate a pressure sensitive device into the spark plug 5.

Figure 9:
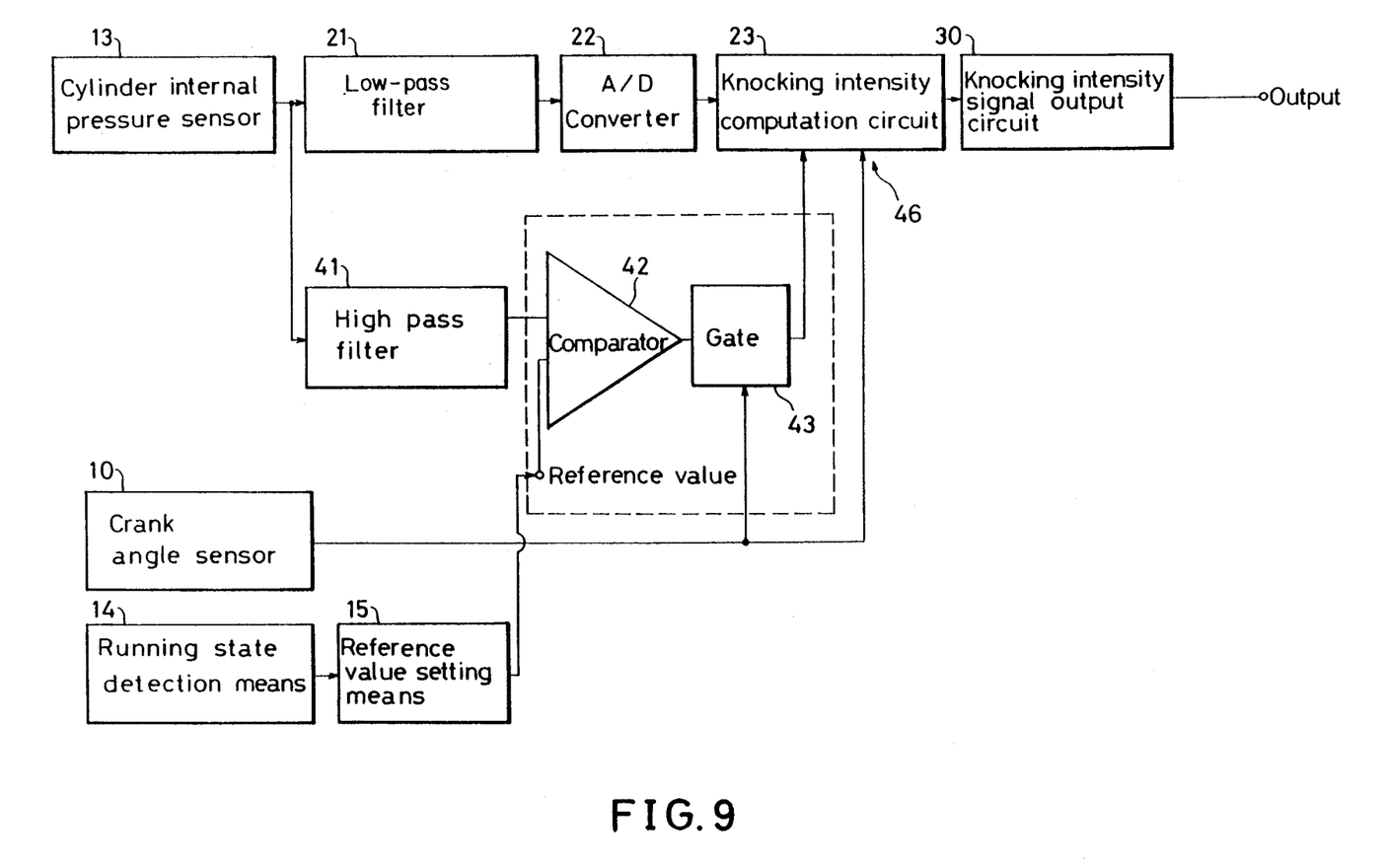
FIG. 9 is a block diagram illustrating a construction of the knocking detector for detection of a knocking heat start point according to this invention.

A running state detection means 14 shown in FIG. 9 comprises the aforesaid air flow meter 7, air intake pressure sensor 9, $O_2$ sensor 11 and temperature sensor 12.

The running state detection means 14, cylinder internal pressure sensor 13 and crank angle sensor 10 output signals to a control unit 20. The control unit 20 comprises electronic circuits based on a microcompute, detects knocking from the input signals, performs computing required for suppressing and controlling knocking or other combustion control, and outputs an injection signal Si and ignition signal Sp to the injector 4 and spark plug 5 respectively.

Figure 2:
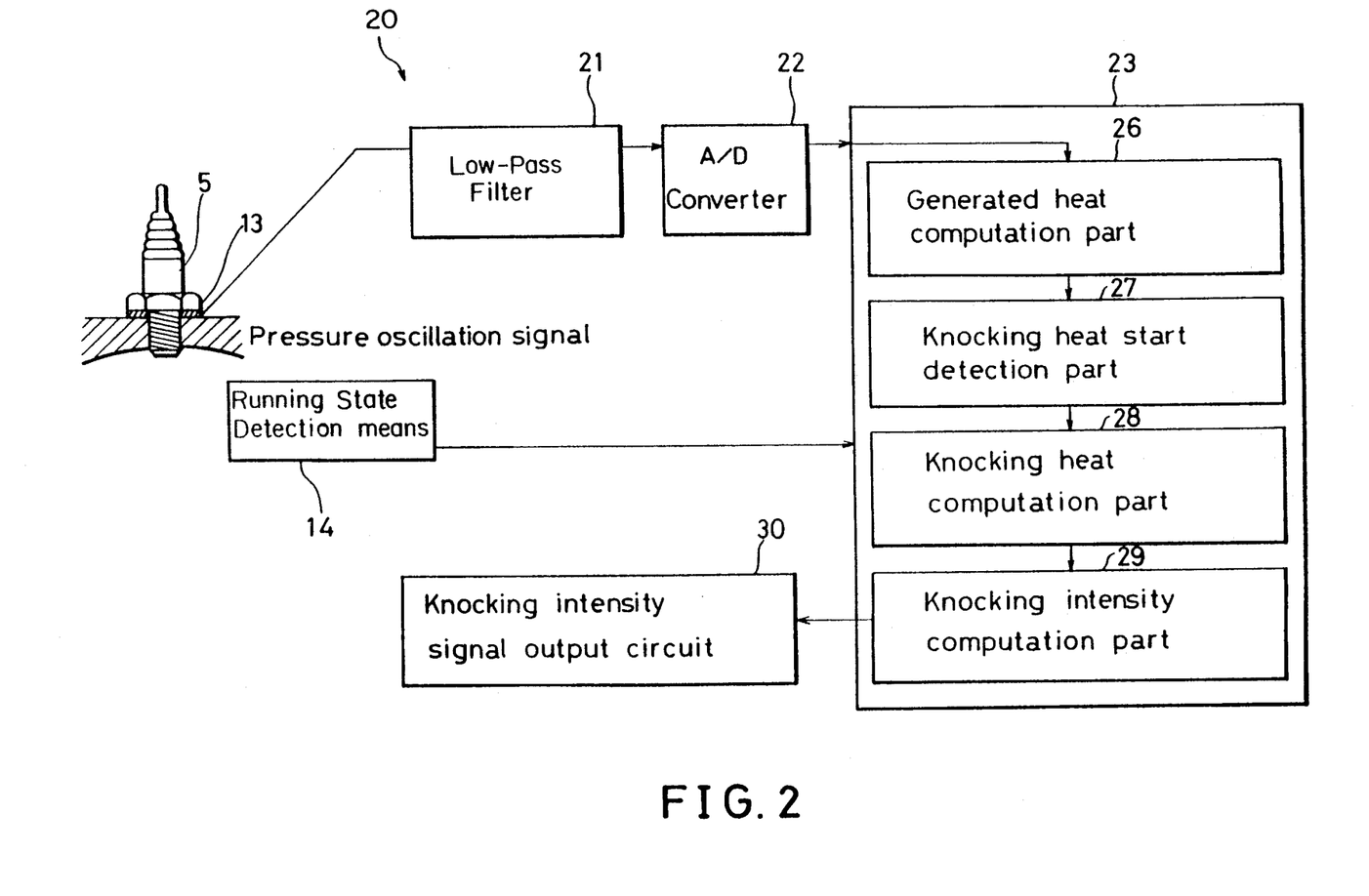
FIG. 2 is a block diagram showing part of a construction of the knocking detector according to this invention.

FIG. 2 shows those parts of the control unit 20 concerned with knocking detection. The output signal from the cylinder internal pressure sensor 13 is input to a low-pass filter 21. After removing predetermined high frequency components, A/D conversion is performed by an A/D converter 22, and the resulting signal is input to a knocking intensity computation circuit 23.

Figure 3:
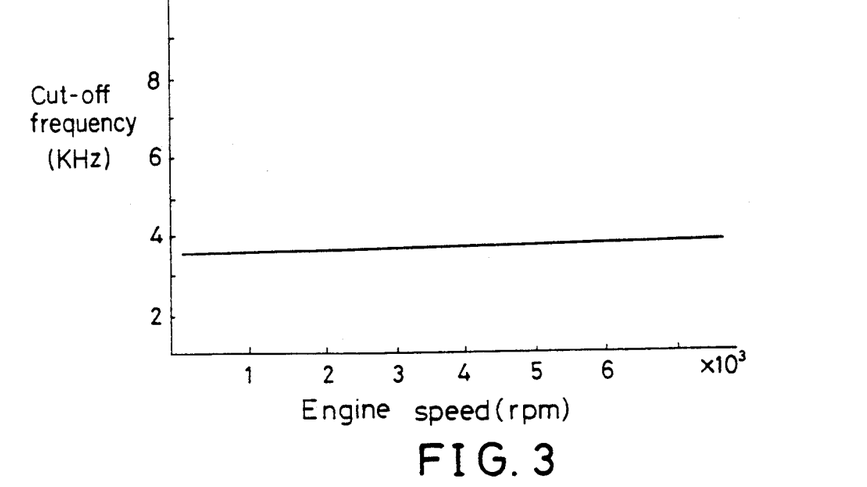
FIG. 3 is a graph showing a cut-off frequency used in the knocking detector according to this invention.

High frequency components have to be removed in order to eliminate noise which would otherwise render the computation of the total amount of heat generated in the combustion chamber 17 inaccurate. The cut-off frequency required to cut off these high frequency components is constant and independent of the speed N of the engine 1 as shown in FIG. 3.

An analog filter may for example be used as the low-pass filter 21. This filter comprises a resistor element of which the resistance varies depending on an oscillation frequency of an input signal, and it is arranged to pass or obstruct a desired frequency band by giving a frequency dependence to the attenuation characteristics of the input signal. The filter may be either a Bessel filter or a Butterworth filter.

The knocking intensity computation circuit 23 comprises a generated heat computation part 26, a knocking heat start detection part 27 which detects when knocking heat begins to be generated, a knocking heat computation part 28, and a knocking intensity computation part 29.

A generated heat computation part 26 computes the total heat generated during one revolution cycle of the crankshaft 16 based on a combustion pressure waveform from which high frequency components have been removed by the low-pass filter 21, a crankshaft angle input by the crank angle sensor 10 and various signals related to the running state of the engine 1 input by the running state detection means 14.

The knocking heat start detection part 27 detects when knocking heat begins to be generated during this cycle.

The knocking heat computation part 28 computes the heat generated due to knocking during the same cycle.

The knocking intensity computation part 29 computes the ratio of the computed total generated heat and knocking heat, determines the knocking intensity based on this ratio, and outputs a determined result via a knocking intensity signal output circuit 30.

This signal is input to an ignition timing control circuit, not shown, in the control unit 20, and is used as information for controlling knocking.

The knocking detector is further provided with a high pass filter 41, comparator 42, gate 43 and reference value setting means 15 as shown in FIG. 9 for detecting when knocking begins.

The output of the cylinder internal pressure sensor 13 is input to a high pass filter 41 arranged in parallel with the low-pass filter 21. The high pass filter 41 passes only specific high frequency components of this signal, and outputs them to the comparator 42. A predetermined reference value is previously input tot he comparator 42, and if the input high frequency components exceed this reference value, a high level signal is output to the gate 43. When the output of the comparator 42 is high level, the gate 43 reads the crankshaft angle detected by the crank angle sensor 10 and outputs a synchronizing signal to the knocking intensity computation circuit 23. In response to this signal, the knocking intensity computation circuit 23 performs processing on a knocking detection flag FKN as described hereinafter.

Figure 10:
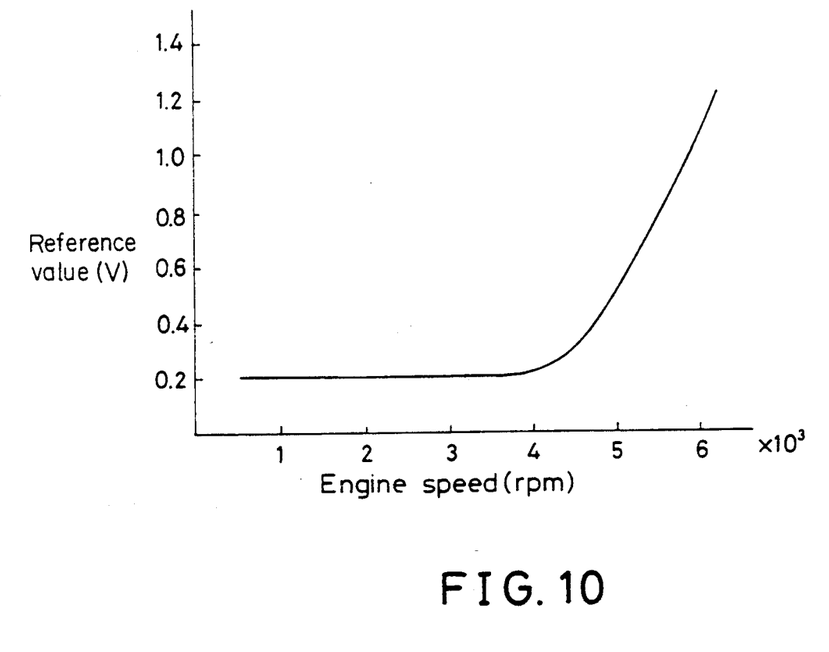
FIG. 10 is a graph showing a reference value of high frequency oscillation level set in the knocking detector according to this invention.
Figure 14:
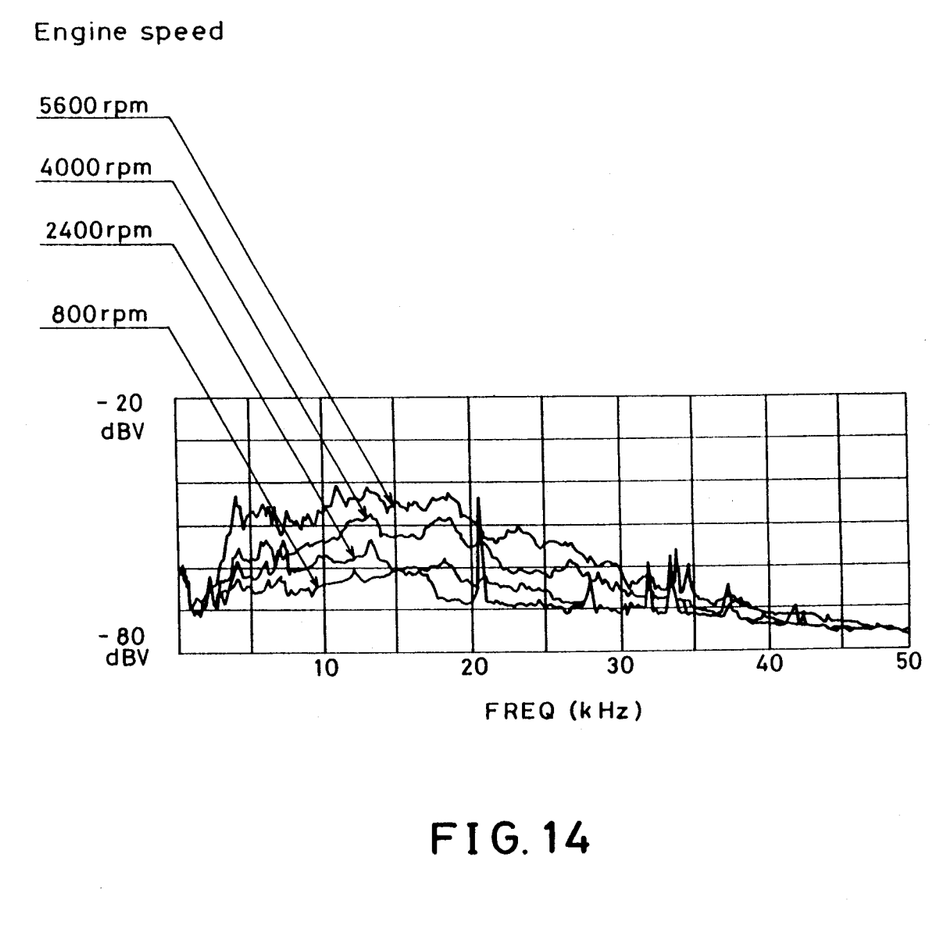
FIG. 14 is a graph illustrating mechanical noise.

The reference value input to the comparator 42 is set by the reference value setting means 15 according to the output of the running state detection means 14. As shown in FIG. 10, for an engine speed of 4000 rpm or higher, the reference value varies in linear proportion to the speed of the engine 1. Up to 4000 rpm, the reference value is set at approximately the same level due to the fact that the mechanical noise level in the detected frequency region does not vary up to this speed as shown in FIG. 14, and the point at which knocking begins can therefore be detected accurately up to high speed.

The knocking detection process using the aforesaid construction will now be described.

Figure 4:
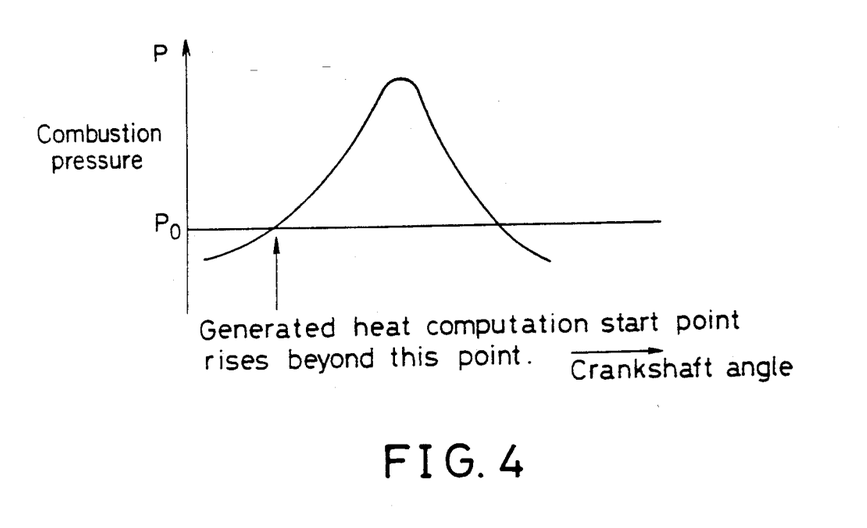
FIG. 4 is a graph showing a relationship between a combustion pressure and a crankshaft angle.

The combustion pressure in the combustion chamber 17 of each cylinder shows a peak on each cycle. FIG. 4 shows the combustion pressure waveform after high frequency components have been removed. The waveform represents the case where combustion takes place normally, i.e., without knocking. The computation of generated heat begins when this pressure signal exceeds the value Po defined as follows:

$$Po = func\ (Tp\ or\ Boost)$$

where Tp is a basic injection amount of fuel, Boost is an intake pressure, and Po is expressed as a function of these parameters. Tp and Boost are obtained from the signals from the running state detection means 14 and crank angle sensor 10.

The computation of generated heat is performed as follows.

Figure 5:
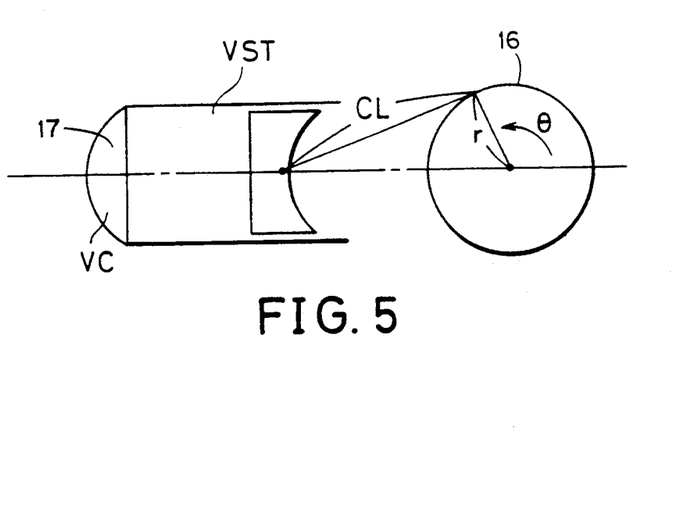
FIG. 5 shows a schematic diagram of the ending describing symbols used for calculating compression ratio in this invention.

First, a compression ratio rc is calculated from the following relation:

$$rc = (VC + VST)/VC = \epsilon$$

where VC and VST are respectively the volume of the combustion chamber 17 and the stroke volume of the piston 18 as shown in FIG. 5.

The total volume V ($\theta$) of VC and VST at a crankshaft angle $\theta$ is given by the following relation:

$$V(\theta) = VST \times \left[\frac{1}{rc-1} - \frac{1+\cos\theta}{2} + \frac{B}{2}\left(1 - \sqrt{1 - \left(\frac{\sin\theta}{B}\right)^2}\right)\right]$$

$$B = 2CL/STL - 2CL/2R = CL/R$$

where r denotes the rotation radius of the crankshaft 16, and CL denotes the length of the connecting rod 19 linking the crankshaft 16 and piston 18.

Figure 6:
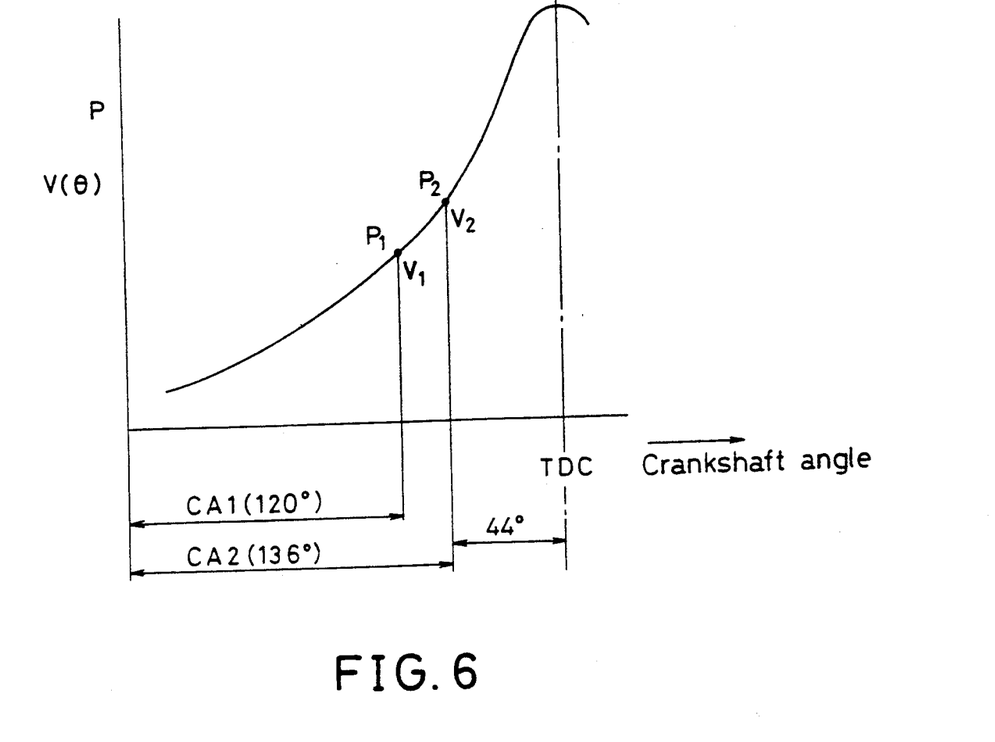
FIG. 6 is a graph showing a waveform of the combustion pressure.

Further, as shown in FIG. 6, a polytropic index PN is found from the combustion pressure $P_1$, $P_2$ and cylinder volumes $V_1$, $V_2$ at 60 degrees and 44 degrees before top dead center from the waveform of the pressure in the combustion chamber 17 during the compression process using the following relation:

$$PN = \frac{\ln P_2 - \ln P_1}{\ln V_1 - \ln V_2}$$

Figures 7A, 7B:
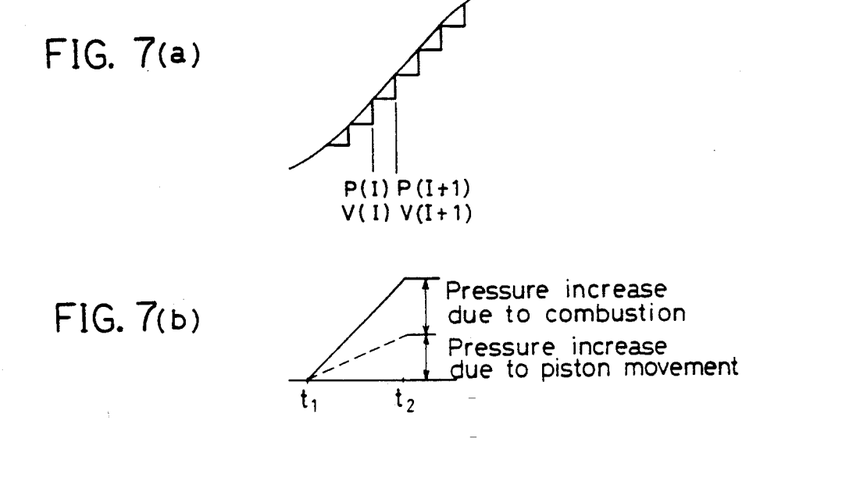
FIG. 7a and 7b show waveform patterns for an analysis of the combustion pressure.

Further, in actual practice, a combustion pressure P(I) and volume V(I) are progressively computed in order to determine the total generated heat. This computation is performed for each unit crankshaft angle, for example if P(I), V(I) correspond to the current crankshaft angle, P(I+1), V(I+1) are computed for the immediately succeeding crankshaft angle as shown in FIG. 7a. The difference between a pressure at a time $t_1$ corresponding to I and a pressure at a time $t_2$ corresponding to I+1 contains a pressure increase due to combustion, and a pressure increase due to piston displacement.

A coefficient Fx required to compute the generated heat is given by the relation:

$$Fx = Cv/R$$

where
Cv = isovolumic specific heat (=0.33)
R = gas constant (=29.13)

If the cylinder volume when compression begins is represented as V(1)=VST, the total generated heat can be found from:

$$Q = \sum_{I=1}^{N} F_K \times \left[\{P(I+1) - P(I)\} - \left\{\left(\frac{V(I)}{V(I+1)}\right)^{PN} - 1\right\} \times P(I)\right] \times V(I)$$

Next, the heat generated by knocking is calculated. The heat generated by knocking is shown by the shaded area of FIG. 8.

In this process the control unit 20 first detects a point at which knocking heat begins to be generated based on the high frequency oscillation in a specific wavelength region (30-40 KHz) extracted via the high pass filter 41 from the output of the cylinder internal pressure sensor 13. The control unit 20 then set a point at which knocking heat ends. This point is for example set at a point where the total heat generation become zero.

Generally, mechanical engine noise varying according to the engine speed as shown in FIG. 14 is confused with the specific oscillation of the pressure signals due to knocking. However, if knocking is detected in a high frequency region as described hereintofore, the effect of mechanical noise is lessened.

Figure 11:
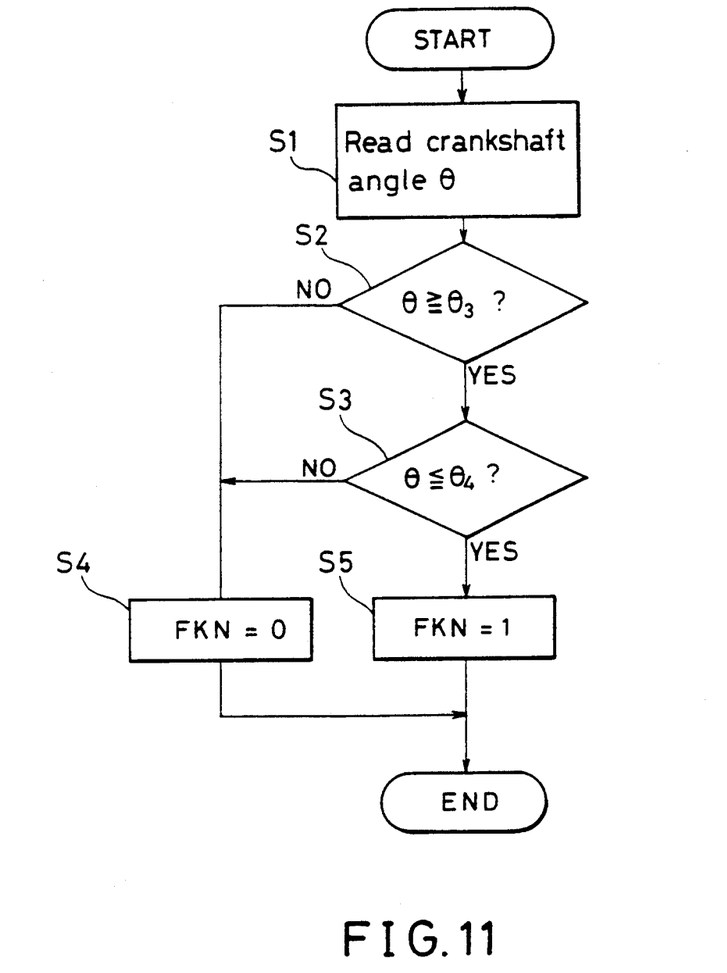
FIG. 11 is a flowchart illustrating a process for setting a knocking detection flag in the knocking detector according to this invention.

FIG. 11 is a flowchart illustrating the processing of a knocking detection flag FKN performed in synchronism with the time at which the output signal of the gate 43 becomes high level.

First, a current crankshaft angle $\theta$ is read in a step S1, and is compared with a predetermined value $\theta_3$ in a step S2. $\theta_3$ is set in the vicinity of top dead center. In $\theta \geq \theta_3$, the crankshaft angle $\theta$ is compared with the predetermined value $\theta_4$ in a step S3. $\theta_4$ is set for example to top dead center +50 degrees.

Figure 12:
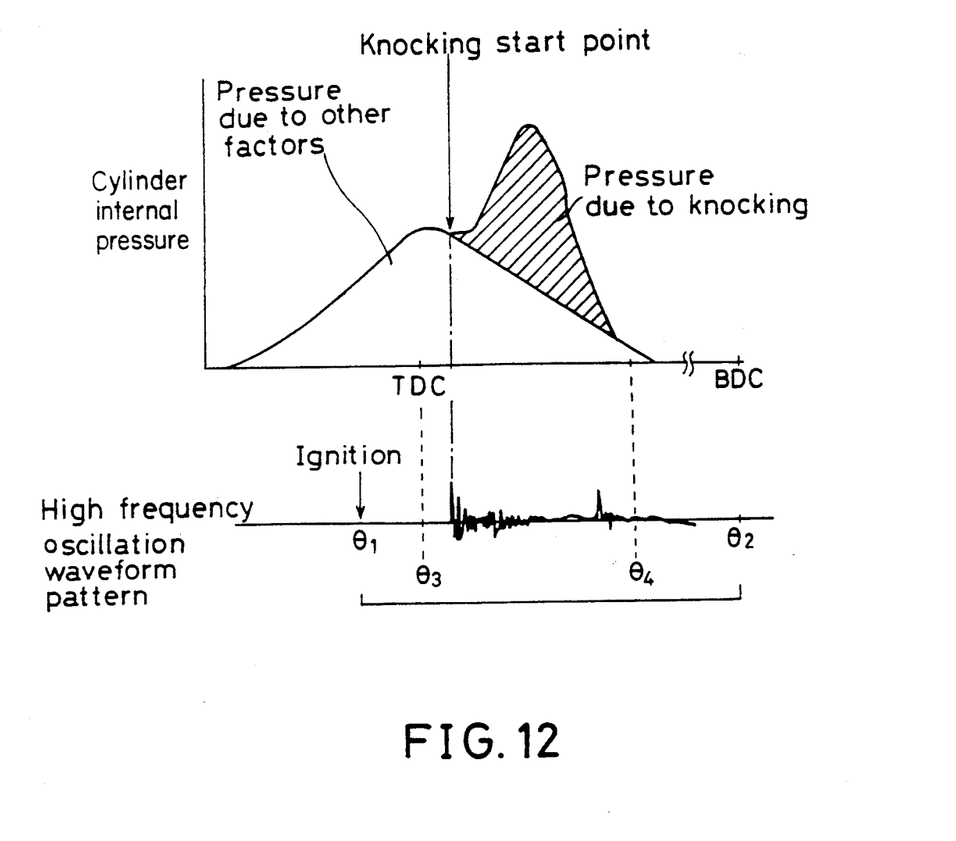
FIG. 12 i a graph illustrating a relationship between knocking and a high frequency oscillation waveform.

From experiments, the inventor has confirmed that the level of the high frequency components in the oscillation waveform output by the cylinder internal pressure sensor 13 rapidly varies in an approximate correspondence with the crankshaft angle at which knocking begins, as shown in FIG. 12. It may thus be concluded that knocking tends to occur within 50 degrees or so from top dead center.

If a synchronizing signal is output by the gate 43, therefore, and $\theta$ is in the range $\theta_3$–$O_4$, it is judged that knocking has begun and the knocking detection flag FKN is set to 1 in a step S5. If however $\theta$ is not in the range $\theta_3$–$\theta_4$, the knocking detection flag FKN is reset to 0 and the routine terminates.

Figure 8:
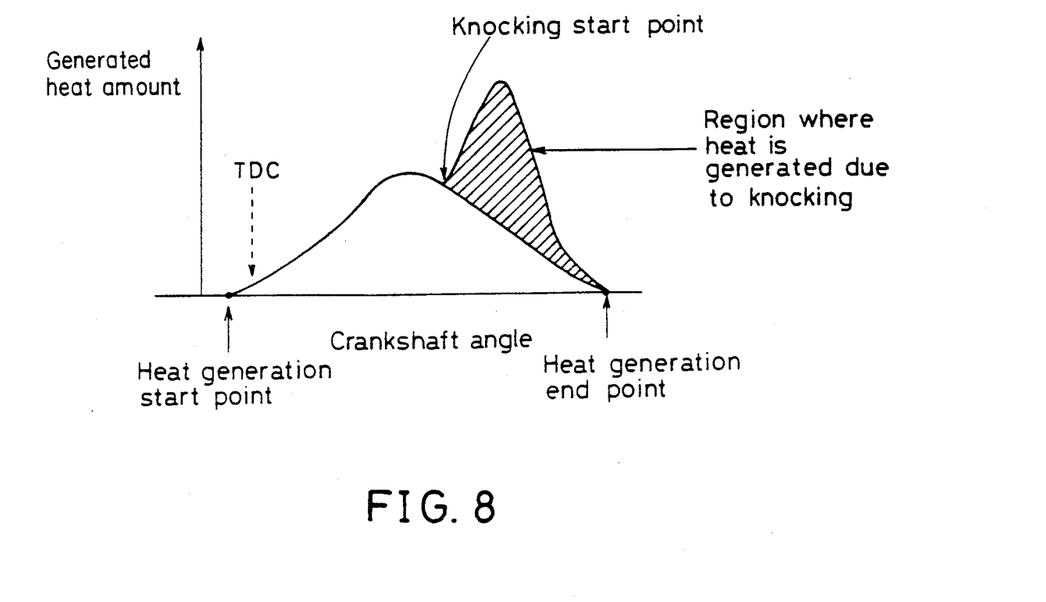
FIG. 8 is a graph illustrating a waveform pattern of a knocking heat.

The heat Q generated due to knocking is found by drawing a straight line between the points at which knocking begins and ends as shown in FIG. 8, and calculating the shaded area above this straight line.

The knocking intensity may then be determined on the basis of a ratio $S=Q_B/Q_A$, where $Q_A$ is the total generated heat and $Q_B$ is the heat due to knocking found in the manner described.

Figure 13:
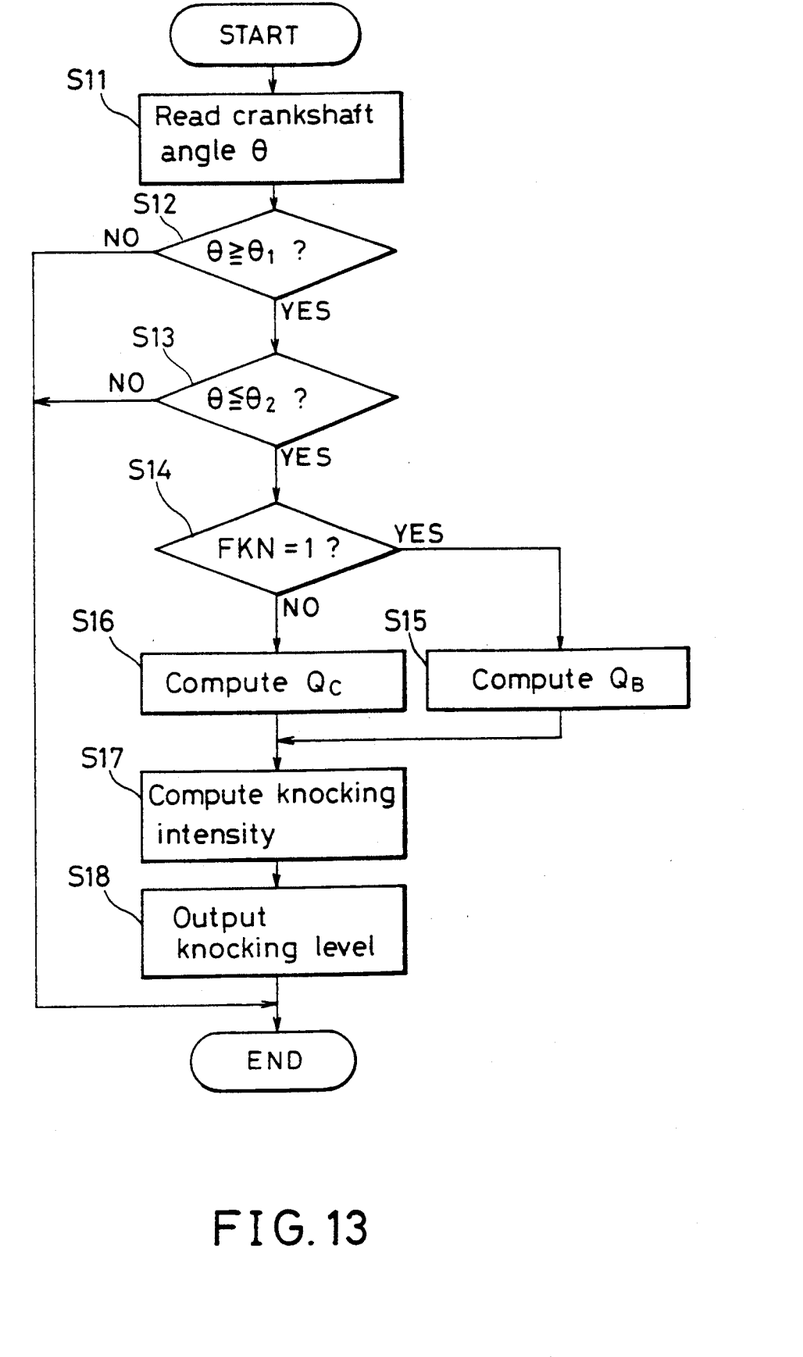
FIG. 13 is a flowchart illustrating a process for judging a knocking intensity in the knocking detector according to this invention.

FIG. 13 is a flowchart illustrating a process for determining knocking intensity. This process is executed in synchronism with unit crankshaft angle (e.g. 1 degree).

First, a crankshaft angle $\theta$ is read in a step 11 and compared with a predetermined value $\theta_1$ in a step 12. $\theta_1$ is set for example to the crankshaft angle corresponding to ignition as shown in FIG. 12. If $\theta \geq \theta_1$, the crankshaft angle $\theta$ is compared to a predetermined value $\theta_2$ in a step 13. $\theta_2$ is set for example to bottom dead center as shown in FIG. 12. This is due to the fact that the crankshaft angle required to specify the point at which knocking begins must lie between the ignition crankshaft angle and bottom dead center.

If therefore the crankshaft angle $\theta$ lies within a range $\theta_1-\theta_2$, it is determined in a step S14 whether or not the knocking detection flag FKN has been set, and if it does not lie within this range, the current routine is terminated.

Further, if in the step S14 FKN=1, it is concluded that knocking has occurred and a corresponding amount of heat generated due to knocking is computed in a step S15. If on the other hand FKN=0, the amount of heat $Q_c$ not due to knocking is computed in a step S16. $Q_C$ is the difference obtained by subtracting the knocking heat $Q_B$ from the total generated heat $Q_A$.

Next, the ratio of the aforesaid two quantities $S=Q_B/Q_C$ is found in order to compute the knocking intensity in a step S17, a knocking level is determined from the ratio S in a step S18, a corresponding intensity signal is output, and the routine is terminated.

Thus, knocking can be detected with high precision irrespective of the type of engine, the installation position of the cylinder internal pressure sensor 13 and individual differences of sensors, and without requiring any modification of the detection logic.

The foregoing description of a preferred embodiment for the purpose of illustrating this invention is not to be considered as limiting or restricting the invention, since many modifications may be made by those skilled in the art without departing from the scope of the invention.

What is claimed is:

1. A knocking detector for an engine provided with a crankshaft and combustion chamber, comprising:
    means for detecting regularly a combustion pressure in said combustion chamber and outputting a corresponding pressure waveform,
    means for eliminating high frequency components from said waveform,
    means for extracting high frequency components from said waveform,
    means for detecting a running state of said engine,
    means for detecting a rotation angle of said crankshaft,
    means for computing a total amount of heat generated in said combustion chamber during one revolution of said crankshaft based on the waveform processed by said high frequency component eliminating means, and on the running state of said engine,
    means for setting a reference level regarding the extracted high frequency components based on the running state of the said engine,
    means for determining a knocking heat start point during one revolution of said crankshaft based on the extracted high frequency components and the reference level set by said setting means,
    means for setting a knocking heat end point during one revolution of said crankshaft;
    means for computing a knocking heat generated during one revolution of said crankshaft based on the knocking heat start point and end point, and on the waveform processed by said high frequency component eliminating means,
    means for determining a knocking intensity based on the total amount of heat and knocking heat.

2. An engine knocking detector as defined in claim 1, wherein said reference level is approximately constant up to a predetermined engine speed, and varies in linear proportion to the engine speed thereafter.

3. An engine knocking detector as defined in claim 1, wherein said high frequency component extraction means extracts high frequency components from 30 kHz to 40 kHz.

* * * * *